United States Patent
Wiessmann et al.

(10) Patent No.: US 10,819,249 B2
(45) Date of Patent: Oct. 27, 2020

(54) CONTROL OF PHASE CURRENTS OF INVERTERS THAT ARE CONNECTED IN PARALLEL

(71) Applicant: Siemens Aktiengesellschaft, Munich (DE)

(72) Inventors: Harald Wiessmann, Erlangen (DE); Bernd Dressel, Burgebrach (DE); Maximilian Schmitt, Eltmann (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/333,538

(22) PCT Filed: Jul. 17, 2017

(86) PCT No.: PCT/EP2017/068008
§ 371 (c)(1),
(2) Date: Mar. 14, 2019

(87) PCT Pub. No.: WO2018/050319
PCT Pub. Date: Mar. 22, 2018

(65) Prior Publication Data
US 2019/0260309 A1    Aug. 22, 2019

(30) Foreign Application Priority Data
Sep. 15, 2016   (EP) .................... 16189016

(51) Int. Cl.
*H02M 1/12*    (2006.01)
*H02M 1/00*    (2006.01)
(Continued)

(52) U.S. Cl.
CPC ........... *H02M 7/493* (2013.01); *H02M 1/084* (2013.01); *H02M 2007/4822* (2013.01)

(58) Field of Classification Search
CPC ...... H02M 1/12; H02M 7/793; H02M 7/5395; H02M 2001/0009; H02M 2007/4822
See application file for complete search history.

(56) References Cited

U.S. PATENT DOCUMENTS

| 4,641,075 A | * | 2/1987 | Asano | ............... | H02M 7/53873 318/811 |
| 5,942,876 A | * | 8/1999 | Maekawa | ......... | H02M 7/53875 318/801 |

(Continued)

FOREIGN PATENT DOCUMENTS

| CN | 102055366 A | 5/2011 |
| CN | 104578835 A | 4/2015 |

(Continued)

OTHER PUBLICATIONS

Mazumder S K: "A novel di screte control strategy for independent stabilization of parallel three-phase boost converters by combining space-vector modulation with variable-structure control", IEEE Transactions on Power Electronics, Institute of Electrical and Electronics Engineers, USA, vol. 18, No. 4, pp. 1070-1083, XP011098785, ISSN: 0885-8993, DOI: 10.1109/TPEL.2003.813770; p. 1070, right Column, as paragraphz—p. 1071, left column, line 14; 2003.

(Continued)

*Primary Examiner* — Thienvu V Tran
*Assistant Examiner* — Sisay G Tiku
(74) *Attorney, Agent, or Firm* — Henry M. Feiereisen LLC

(57) ABSTRACT

Disclosed is a method for controlling phase currents of a plurality of three-phase inverters connected in parallel. The phase currents of each inverter are controlled by direct hysteresis current control wherein an actual current space vector for actual values of the phase currents of each inverter is maintained about a target current space vector within a hysteresis window. The measured current space vector of a (Continued)

first inverter is formed by all three phase currents of the first inverter. The actual current space vector of each additional inverter is formed from exactly two phase currents of the respective additional inverter under the proviso that all three phase currents of the additional inverters add up to zero. The selection of the two phase currents from which the actual current space vector is formed, is varied.

12 Claims, 2 Drawing Sheets

(51) Int. Cl.
| | | |
|---|---|---|
| *H02M 7/793* | (2006.01) | |
| *H02M 7/539* | (2006.01) | |
| *H02M 7/493* | (2007.01) | |
| *H02M 1/084* | (2006.01) | |
| *H02M 7/48* | (2007.01) | |

(56) References Cited

U.S. PATENT DOCUMENTS

| | | | | |
|---|---|---|---|---|
| 8,487,568 B2* | 7/2013 | Franke | ............... | H02M 7/493 318/400.3 |
| 2011/0103110 A1 | 5/2011 | Godridge | | |
| 2011/0304214 A1* | 12/2011 | Haddad | ............... | H02M 3/1584 307/82 |
| 2012/0187893 A1* | 7/2012 | Baba | ............... | H02P 25/024 318/722 |
| 2015/0357934 A1* | 12/2015 | Hirsch | ............... | H02M 7/5395 318/400.02 |
| 2016/0111973 A1* | 4/2016 | Deflorio | ............... | H02P 27/06 318/400.02 |
| 2016/0156291 A1* | 6/2016 | Becker | ............... | H02M 7/68 318/400.26 |
| 2016/0248315 A1* | 8/2016 | Basic | ............... | H02M 1/12 |
| 2016/0352278 A1* | 12/2016 | Jiang | ............... | B66B 1/308 |
| 2017/0141698 A1* | 5/2017 | Nikolov | ............... | H02M 1/0845 |
| 2019/0326833 A1* | 10/2019 | Benesch | ............... | H02M 7/483 |
| 2019/0356256 A1* | 11/2019 | Lamsahel | ............... | H02P 27/08 |

FOREIGN PATENT DOCUMENTS

| | | |
|---|---|---|
| EP | 3059848 A1 | 8/2016 |
| WO | WO 2015108614 A1 | 7/2015 |

OTHER PUBLICATIONS

Zhang Di et al: "Common-Mode Circulating Current Control of Paralleled Interleaved Three-Phase Two-Level Voltage-Source Converters With Discontinuous Space-Vector Modulation", IEEE Transactions on Power Electronics, Institute of Electrical and Electronics Engineers, USA, vol. 26, No. 12, pp. 3925-3935, XP011479936, ISSN: 0885-8993, DOI: 10.1109/TPEL.2011.2131681; pp. 3928, left column; 2011.

Schellekens J M et al: "Inter I eaved switching of parallel ZVS hysteresis current controlled inverters", 2010 International Power Electronics Conference: IPEC-SAPPORO 2010—[ECCEASIA]; Sapporo, Japan, IEEE, Piscataway, NJ, USA, pp. 2822-2829, XP031729073, ISBN: 978-1-4244-5394-8; Seite 1, left column, line 1—p. 2, right column, row 8;; 2010.

Ghennam Tarak et al; "A Novel Space-Vector Current Control Based on Circular Hysteresis Areas of a Three-Phase Neutral-Point-Clamped Inverter", IEEE Transactions on Industrial Electronics, IEEE Service Center, Piscataway, NJ, USA, vol. 54, No. 8, pp. 2669-2678, XP011297152, ISSN: 0278-0046; das ganze Dokument; 2010.

* cited by examiner ional Application No. PCT/EP2017/068008, filed Jul. 17, 2017, which designates the United States and has been published as International Publication No. WO 2018/050319 and which claims the priority of European Patent Application, Serial No. 16189016.5, filed Sep. 15, 2016, pursuant to 35 U.S.C. 119(a)-(d).

CONTROL OF PHASE CURRENTS OF INVERTERS THAT ARE CONNECTED IN PARALLEL

CROSS-REFERENCES TO RELATED APPLICATIONS

This application is the U.S. National Stage of International Application No. PCT/EP2017/068008, filed Jul. 17, 2017, which designates the United States and has been published as International Publication No. WO 2018/050319 and which claims the priority of European Patent Application, Serial No. 16189016.5, filed Sep. 15, 2016, pursuant to 35 U.S.C. 119(a)-(d).

BACKGROUND OF THE INVENTION

The invention relates to the control of phase currents of a plurality of three-phase inverters connected in parallel.

The inverters each generate pulsed phase voltages, which can assume the plurality of voltage values. To this end, each inverter has a switching unit with a plurality of switching states for each phase, by means of which the phase voltage of the phase is in each case set on one of the voltage values.

Parallel circuits of a plurality of inverters are frequently used to interconnect the individual inverters to form an inverter with a higher overall power and availability. The individual inverters are often operated in a pulse-width-modulated manner with an indirect current control. In doing this the individual inverters either gain the same control signals or are controlled for the purpose of reducing a harmonic load of a supplying mains with different pulse patterns.

EP 3059848 A1 discloses a control of transverse currents in a power supply with a number of converters.

The object underlying the invention is to specify an improved control of phase currents of a plurality of three-phase inverters connected in parallel.

SUMMARY OF THE INVENTION

The object is achieved according to the invention by a method for controlling phase currents of a number of three-phase inverters connected in parallel, wherein the phase currents of each inverter are controlled with a direct hysteresis current control, wherein a measured current space vector for measured values of the phase currents of the inverter is held within a hysteresis window about a target current space vector, the measured current space vector of a first inverter is formed from all three phase currents of the first inverter, and the measured current space vector of each further inverter s formed from exactly two phase currents of the inverter while assuming that all three phase currents of the inverter add up to zero, the selection of the two phase currents from which the measured current space vector is formed being varied.

Advantageous embodiments of the invention are the subject matter of the subclaims.

With an inventive method for controlling phase currents of a plurality of three-phase inverters connected in parallel, the phase currents of each inverter are controlled by way of a direct hysteresis current control, wherein a measured current space vector for measured values of the phase currents of the inverter is maintained within a hysteresis window about a desired current space vector. The measured current space vector of a first inverter is formed from all three phase currents of the first inverter. The measured current space vector of each further inverter is formed from exactly two phase currents of the inverter by assuming that all three phase currents of the inverter are added up to zero, wherein the selection of the two phase currents, from which the measured current space vector is formed, is varied.

A hysteresis control is understood to mean a control in which the control variable is maintained in a tolerance range about a target value. The tolerance range is referred to here as hysteresis window. A direct current control is understood to mean a current control, the pulse pattern of which is derived directly from a current error. However, with an indirect current control, a voltage target value is firstly determined and the pulse pattern is ascertained on the basis of this voltage value.

The invention therefore provides a direct hysteresis current control of the phase currents of each inverter. Compared with an indirect current control based on pulse width modulation, a direct current control advantageously allows for higher dynamics and robustness, for instance with respect to changes to parameters in the control path, since with an indirect current control based on pulse width modulation, the pulse patterns of the pulse width modulation used within the pulse periods must be precalculated.

The inventive formation of the measured current space vector for controlling the phase currents is used to reduce circular currents flowing between the inverters connected in parallel. Such circular currents are portions of zero system currents of the inverters. A zero system current of an inverter is produced as a non-vanishing sum of the three phase currents of the inverter. Zero system currents are caused by parasitic elements, e.g. parasitic capacitances, of the inverters connected in parallel and different switching states of the inverters.

Circular currents between inverters connected in parallel are exactly those portions of the zero system currents which flow between the inverters. Circular currents of this type reduce the total power of the inverters connected in parallel, since they flow between the inverters connected in parallel and therefore do not contribute to the mains currents, which are output outwards to a mains from the inverters which are connected in parallel.

It is therefore advantageous to avoid or reduce such circular currents as far as possible. This is achieved in accordance with the invention by the measured current space vector of each further inverter, which differs from a first inverter, being formed at each time instant from exactly two phase currents, wherein it is assumed that all three phase currents of the inverter add up to zero, even if this is generally (namely with a non-vanishing zero system current) actually not the case. As a result, the two phase currents, from which the measured current space vector of one of the further inverters is formed, are controlled to their target values, even if a zero system current of this inverter does not vanish. With a non-vanishing zero system current, the third phase current is indeed not controlled to its target value. However, by varying, i.e. by changing the selection of those phase currents from which the measured current space vector of the further inverter is formed in each case consecutively over time makes it possible, following a short harmonic phase of the control, for all three phase currents to correspond at least approximately (within the hysteresis window) to their target values. As a result, zero system currents in the further inverters are essentially eliminated (apart from zero system currents with current strengths in the region of the breadth of the hysteresis window). A zero system current in the first inverter is indeed not controlled actively, but, on account of the control of the further inverters, does however not lead to a circular current between the first inverter and a further inverter.

One embodiment of the invention provides that the phase currents of each inverter are controlled independently of the measured values of the phase currents of the other inverters. According to this embodiment of the invention, no communication is used between the individual inverters. As a result, the modularity of the total system consisting of a plurality of inverters is advantageously increased, so that inverters can be easily interconnected, without having to implement communication between the inverters. Furthermore, the effort involved in realizing the total system is reduced and the robustness of the total system is increased.

A further embodiment of the invention provides that that phase, the phase current of which is not used to form the measured current space vector, is not switched for each of the further inverters. This embodiment of the invention therefore provides what is known as a Flat Top modulation to each of the further inverters, whereby in each clock period of the control, that phase, the phase current of which is currently not used to form the measured current space vector, is not switched. This embodiment of the invention advantageously reduces the number of switching processes and thus the switching losses when the phases are switched.

A further embodiment of the invention provides that the selection of the two phase currents, from which the measured current space vector is formed, is varied for each of the further inverters as a function of a phasing of the required output voltages. For instance, the phase with the largest output voltage of the inverter, according to amount, is selected for each of the further inverters as that phase, the phase current of which is not used to form the measured current space vector. These embodiments of the invention therefore couple the selection of the phases of a further inverter used to form the measured current space vector in each case to the phasing of the output voltages of the inverter. As a result, switching losses can be further reduced particularly with approximately identical phasing of output currents and output voltages, since in each case the phase is not switched with the currently highest current strength.

A further embodiment of the invention provides that the same measured current space vector is used for all inverters at each point in time. As a result, the inverters are advantageously loaded equally and the current control is further simplified.

A further embodiment of the invention provides that each measured current space vector and each target current space vector are formed in a fixed stator coordinate system. In this process the measured current space vector of the first inverter is formed, for instance according to $$\begin{pmatrix} i_{\alpha_{WR_1}} \\ i_{\beta_{WR_1}} \\ i_{0_{WR_1}} \end{pmatrix} = \frac{1}{3} \begin{pmatrix} 2 & -1 & -1 \\ 0 & \sqrt{3} & -\sqrt{3} \\ 1 & 1 & 1 \end{pmatrix} * \begin{pmatrix} i_{U_{WR_1}} \\ i_{V_{WR_1}} \\ i_{W_{WR_1}} \end{pmatrix},$$

wherein $i_{U\_WR1}$, $i_{V\_WR1}$, $i_{W\_WR1}$ refer to the phase currents (more precisely: measured values of the phase currents) of the first inverter. The measured current space vector of each further inverter is formed as a function of the phase currents selected for its formation according to $$\begin{pmatrix} i_{\alpha_{WR_2}} \\ i_{\beta_{WR_2}} \\ i_{0_{WR_2}} \end{pmatrix}^* = \frac{1}{3} \begin{pmatrix} 3 & 0 & 0 \\ \sqrt{3} & 2\sqrt{3} & 0 \\ 0 & 0 & 0 \end{pmatrix} * \begin{pmatrix} i_{U_{WR_2}} \\ i_{V_{WR_2}} \\ i_{W_{WR_2}} \end{pmatrix}$$

or according to $$\begin{pmatrix} i_{\alpha_{WR_2}} \\ i_{\beta_{WR_2}} \\ i_{0_{WR_2}} \end{pmatrix}^{**} = \frac{1}{3} \begin{pmatrix} 0 & -3 & -3 \\ 0 & \sqrt{3} & -\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}$$

or according to $$\begin{pmatrix} i_{\alpha_{WR_2}} \\ i_{\beta_{WR_2}} \\ i_{0_{WR_2}} \end{pmatrix}^{***} = \frac{1}{3} \begin{pmatrix} 3 & 0 & 0 \\ -\sqrt{3} & 0 & -2\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}$$

wherein $i_{U\_WR2}$, $i_{V\_WR2}$, $i_{W\_WR2}$ refer to the phase currents (more precisely: measured values of the phase currents) of a further inverter. These embodiments of the invention realize the afore-cited advantageous formation of the measured current space vector of the inverters specifically by what are known as Clark transformations of the measured values of the phase currents.

A further embodiment of the invention provides that an SDHC current control is used as a hysteresis current control. A current control method is understood to mean what is known as an SDHC current control (Switched Diamond Hysteresis Control), and has been published in H. Wießmann, Hochdynamisches direktes Stromregelverfahren für Pulswechselrichter im Vergleich zu PWM-Verfahren [Highdynamic direct current control method for pulse inverters compared with PWM methods], ISBN 978-3843904759, publishing house Dr. Hut 2012. With an SDHC method, four adjacent space vectors are used to control the current in a converter at any time instant, the peaks of which form a diamond. The SDHC method advantageously connects the high dynamics and robustness of a direct hysteresis current control with the excellent stationary behavior of a space vector-modulated converter.

An inventive control device for carrying out the inventive method comprises a current measuring device for each inverter for the purpose of acquiring the measured values of the phase currents of the inverter and a hysteresis current control device for each inverter, with which the measured current space vector of the inverter is formed from the acquired measured values of the phase currents and switching signals are produced for the phases of the inverter, in order to maintain the measured current space vector within the hysteresis window about the target current space vector. The advantages of a control device of this type result from the afore-cited advantages of the inventive method.

BRIEF DESCRIPTION OF THE DRAWING

The above-described characteristics, features and advantages of this invention, as well as the manner in which these are realized, will become more clearly and easily intelligible in connection with the following description of exemplary embodiments which are explained in more detail in connection with the drawings, in which.

DETAILED DESCRIPTION OF PREFERRED EMBODIMENTS

Figure 1:
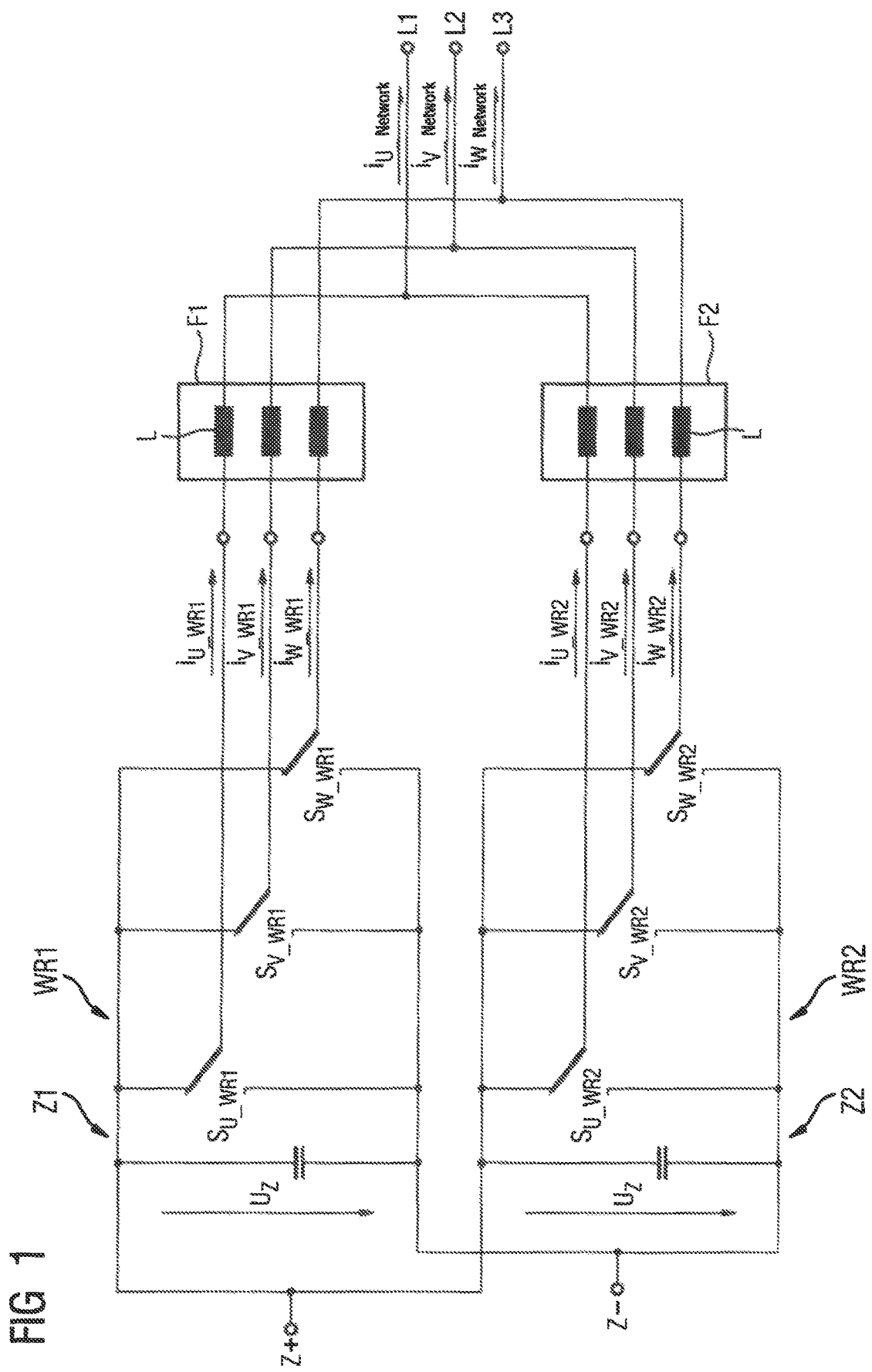
FIG. 1 shows an equivalent circuit diagram of two inverters connected in parallel.

Parts which correspond to one another are provided with the same reference characters in the figures.

FIG. 1 shows an equivalent circuit diagram of two three-phase inverters WR1, WR2 connected in parallel.

Each inverter WR1, WR2 has a direct voltage intermediate circuit Z1, Z2 on the input side with a positive intermediate circuit potential Z+, a negative intermediate circuit potential Z- and an intermediate circuit voltage $U_Z$ which is the difference between these intermediate circuit potentials Z+, Z-. The direct voltage intermediate circuits Z1, Z2 of the inverters WR1, WR2 are connected in parallel so that they have the same positive intermediate circuit potential Z+, the same negative intermediate circuit potential Z- and the same intermediate circuit voltage $U_Z$.

Furthermore, for each of its phases each inverter WR1, WR2 comprises a switch $S_{U\_WR1}$, $S_{V\_WR1}$, $S_{W\_WR1}$, $S_{U\_WR2}$, $S_{V\_WR2}$, $S_{W\_WR2}$ with a first switching state, which sets a phase potential of the phase on the positive intermediate circuit potential Z+ and a second switching state, which sets the phase potential of the phase on the negative intermediate circuit potential Z-. A change in the switching state of the switch $S_{U\_WR1}$, $S_{V\_WR1}$, $S_{W\_WR1}$, $S_{U\_WR2}$, $S_{V\_WR2}$, $S_{W\_WR2}$ of a phase is referred to here as switching the phase.

Each inverter WR1, WR2 is coupled on the output side via a separate filter F1, F2 to a mains supply. The filters F1, F2 each have at least one inductance L for each phase of the respective inverter WR1, WR2. The two phases of the two inverters WR1, WR2 which correspond to one another are interconnected on the output side and connected to a shared mains-side terminal L1, L2, L3, so that the two phase currents $i_{U\_WR1}$, $i_{V\_WR1}$, $i_{W\_WR1}$, $i_{U\_WR2}$, $i_{V\_WR2}$, $i_{W\_WR2}$ of these phases of the two inverters WR1, WR2 add up to a phase mains current $i_{U\_Network}$, $i_{V\_Network}$, $i_{W\_Network}$ which is output via the terminal L1, L2, L3 connected to these phases.

Figure 2:
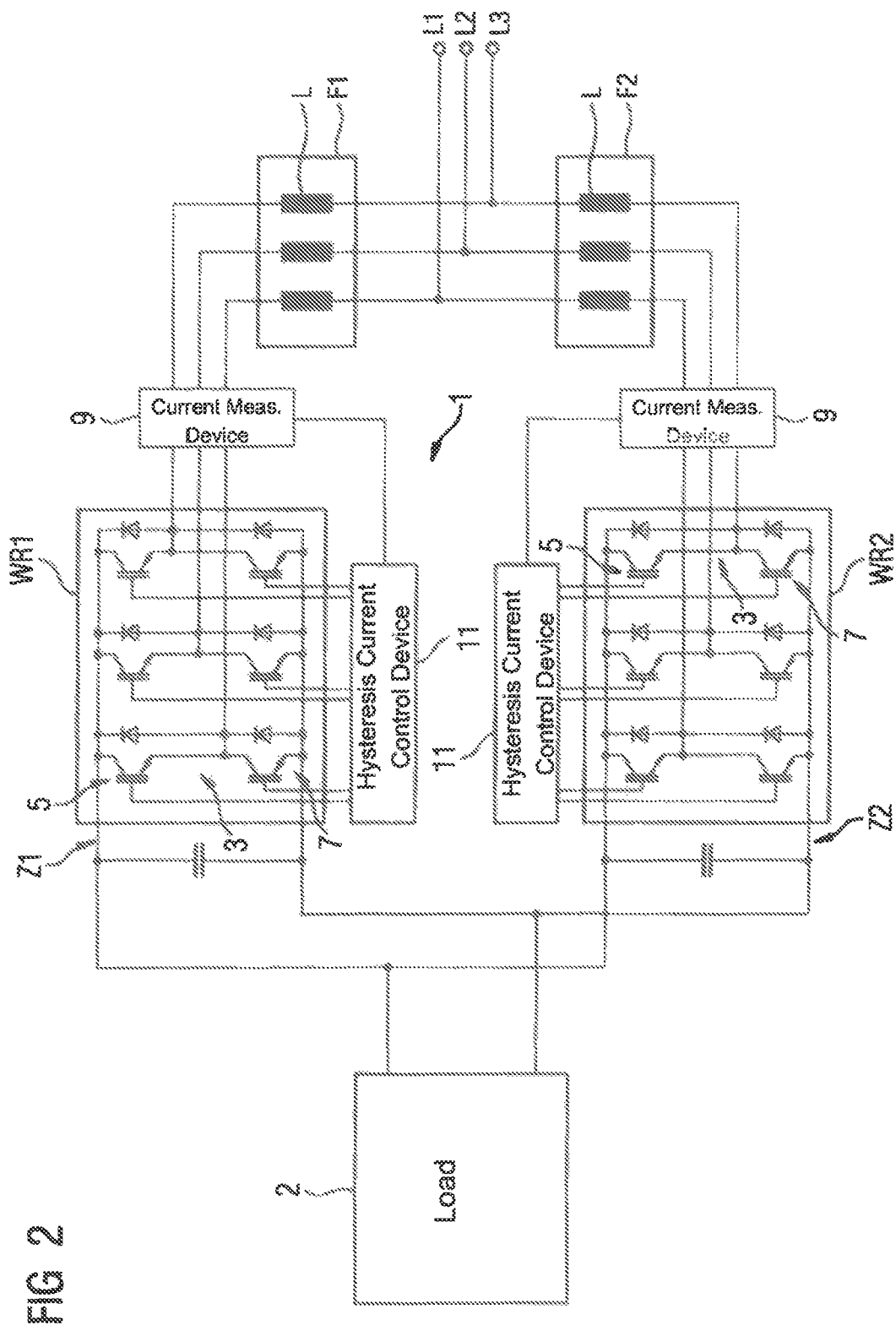
FIG. 2 shows a circuit diagram of an exemplary embodiment of two inverters connected in parallel and a control device for controlling phase currents of the inverters.

FIG. 2 shows a circuit diagram of a specific exemplary embodiment of two three-phase inverters WR1, WR2 connected in parallel according to FIG. 1 as well as a control device 1 for controlling the phase currents $i_{U\_WR1}$, $i_{V\_WR1}$, $i_{W\_WR1}$, $i_{U\_WR2}$, $i_{V\_WR2}$, $i_{W\_WR2}$ of the inverters WR1, WR2 and a load 2 connected on the input side to the direct voltage intermediate circuits Z1, Z2 of the inverters WR1, WR2.

The switches $S_{U\_WR1}$, $S_{V\_WR1}$, $S_{W\_WR1}$, $S_{U\_WR2}$, $S_{V\_WR2}$, $S_{W\_WR2}$ are each embodied as a switching unit which has a half bridge 3 with a first switching element 5 and a second switching element 7. The switching elements 5, 7 are each embodied, for instance, as a bipolar transistor with an insulated gate electrode (IGBT=Insulated-Gate Bipolar Transistor), for instance. The first switching state of each switch $S_{U\_WR1}$, $S_{V\_WR1}$, $S_{W\_WR1}$, $S_{U\_WR2}$, $S_{V\_WR2}$, $S_{W\_WR2}$ is established by closing the first switching element 5 and opening the second switching element 7, the second switching state is established by opening the first switching element 5 and closing the second switching element 7.

The control device 1 comprises, for each inverter WR1, WR2, a current measuring device 9 for acquiring the measured values of the phase currents $i_{U\_WR1}$, $i_{V\_WR1}$, $i_{W\_WR1}$, $i_{U\_WR2}$, $i_{V\_WR2}$, $i_{W\_WR2}$ of the inverter WR1, WR2 and a hysteresis current control device 11, with which switching signals for the phases of the inverter WR1, WR2 are generated from the acquired measured values of the phase currents $i_{U\_WR1}$, $i_{V\_WR1}$, $i_{W\_WR1}$, $i_{U\_WR1}$, $i_{V\_WR2}$, $i_{W\_WR2}$ in the manner described below in more detail, with which the switches $S_{U\_WR1}$, $S_{V\_WR1}$, $S_{W\_WR1}$, $S_{U\_WR2}$, $S_{V\_WR2}$, $S_{W\_WR2}$, i.e. in the exemplary embodiment shown in FIG. 2 the switching elements 5, 7 are controlled.

The phase currents $i_{U\_WR1}$, $i_{V\_WR1}$, $i_{W\_WR1}$, $i_{U\_WR2}$, $i_{V\_WR2}$, $i_{W\_WR2}$ of each inverter WR1, WR2 are controlled by the respective hysteresis current control device 11 with a direct hysteresis current control independently of the measured values of the phase currents $i_{U\_WR1}$, $i_{V\_WR1}$, $i_{W\_WR1}$, $i_{U\_WR2}$, $i_{V\_WR2}$, $i_{W\_WR2}$ of the respective other inverter WR1, WR2. Here a measured current space vector is formed from the measured values of the phase currents $i_{U\_WR1}$, $i_{V\_WR1}$, $i_{W\_WR1}$, $i_{U\_WR2}$, $i_{V\_WR2}$, $i_{W\_WR2}$, acquired by the current measuring device 9, of each inverter WR1, WR2 in a fixed stator coordinate system in the manner described below in more detail. The measured current space vector is maintained within a hysteresis window about a target current space vector. The same target current space vector is used for both inverters WR1, WR2 at the same time, for instance.

Furthermore, a hysteresis current control with a behavior comparable to a Flat Top modulation is used, in which a phase of each inverter WR1, WR2 is not switched in each clock period of the control. This is in each case preferably the phase, the output voltage of which, according to size, is currently the largest output voltage of the respective inverter WR1, WR2. As a result, the fixed stator coordinate system is divided into sectors of 60 degrees in each case, wherein in adjacent sectors another phase is not switched in each case.

An SDHC current control is preferably used as a hysteresis current control.

The measured current space vector of a first inverter WR1 is formed from the current strengths of all three phase currents $i_{U\_WR1}$, $I_{V\_WR1}$, $I_{W\_WR1}$ of the first inverter WR1 according to the following equation [1], which is a conventional Clark transformation, wherein $i_{O\_WR1}$ refers to the zero system current of the first inverter WR1:

$$\begin{pmatrix} i_{\alpha WR_1} \\ i_{\beta WR_1} \\ i_{0 WR_1} \end{pmatrix} = \frac{1}{3} \begin{pmatrix} 2 & -1 & -1 \\ 0 & \sqrt{3} & -\sqrt{3} \\ 1 & 1 & 1 \end{pmatrix} * \begin{pmatrix} i_{U WR_1} \\ i_{V WR_1} \\ i_{W WR_1} \end{pmatrix}. \quad [1]$$

Contrary hereto the measured current space vector of the second inverter WR2 is formed at each time instant from just exactly two of the three phase currents $i_{U\_WR2}$, $i_{V\_WR2}$, $i_{W\_WR2}$ of the second inverter WR2 according to one of the following equations [2] to [4]:

$$\begin{pmatrix} i_{\alpha WR_2} \\ i_{\beta WR_2} \\ i_{0 WR_2} \end{pmatrix}^* = \frac{1}{3} \begin{pmatrix} 3 & 0 & 0 \\ \sqrt{3} & 2\sqrt{3} & 0 \\ 0 & 0 & 0 \end{pmatrix} * \begin{pmatrix} i_{U WR_2} \\ i_{V WR_2} \\ i_{W WR_2} \end{pmatrix}, \quad [2]$$

$$\begin{pmatrix} i_{\alpha WR_2} \\ i_{\beta WR_2} \\ i_{0 WR_2} \end{pmatrix}^{**} = \frac{1}{3} \begin{pmatrix} 0 & -3 & -3 \\ 0 & \sqrt{3} & -\sqrt{3} \\ 0 & 0 & 0 \end{pmatrix} * \begin{pmatrix} i_{U WR_2} \\ i_{V WR_2} \\ i_{W WR_2} \end{pmatrix}, \quad [3]$$

-continued $$\begin{pmatrix} i_{\alpha_{WR2}} \\ i_{\beta_{WR2}} \\ i_{0_{WR2}} \end{pmatrix}^{***} = \frac{1}{3} \begin{pmatrix} 3 & 0 & 0 \\ -\sqrt{3} & 0 & -2\sqrt{3} \\ 0 & 0 & 0 \end{pmatrix} * \begin{pmatrix} i_{U_{WR2}} \\ i_{V_{WR2}} \\ i_{W_{WR2}} \end{pmatrix}, \quad [4]$$

wherein the respective selected equation of the equations [2] to [4] varies, i.e. is changed at consecutive time instants. Each of the equations [2] to [4] is a Clarke transformation, in which in each case a phase current $i_{U\_WR2}$, $i_{V\_WR2}$, $i_{V\_WR2}$ has been calculated from the two other phase currents $i_{U\_WR2}$, $I_{V\_WR2}$, $i_{W\_WR2}$ of the second inverter WR2 while assuming that the three phase currents $_{U\_WR2}$, $i_{V\_WR2}$, $i_{W\_WR2}$ add up to zero, i.e. while assuming that the zero system current of the second inverter WR2 vanishes, although this is not actually generally the case.

With the formation of the measured current space vector of the second inverter WR2 according to one of the equations [2] to [4], one of the phase currents $i_{U\_WR2}$, $I_{V\_WR2}$, $i_{W\_WR2}$ is therefore not used, i.e. the measured current space vector of the second inverter WR2 is in each case only formed from the measured values of the two other phase currents $i_{U\_WR2}$, $i_{V\_WR2}$, $i_{W\_WR2}$. In equation [2], the phase current $i_{W\_WR2}$ is not used to form the measured current space vector, in equation [3] the phase current $i_{U\_WR2}$ and in equation [4] the phase current $i_{V\_WR2}$.

Preferably that phase current $i_{U\_WR2}$, $i_{V\_WR2}$, $i_{W\_WR2}$, the phase of which is currently not switched in accordance with the Fiat-Top modulation, is in each case not used to form the measured current space vector of the second inverter WR2. If, in accordance with an afore-cited preferred embodiment, this phase is always the phase, the phase current $i_{U\_WR2}$, $i_{V\_WR2}$, $i_{W\_WR2}$ of which is the currently largest phase current $i_{U\_WR2}$, $i_{V\_WR2}$, $i_{W\_WR2}$ of the second inverter WR2, according to amount, the fixed stator coordinate system is divided into sectors of in each case 60 degrees, wherein in adjacent sectors another of the equations [2] to [4] is used to form the measured current space vector of the second inverter WR2.

By forming the measured current space vector of the second inverter WR2 according to one of the equations [2] to [4], the two phase currents $i_{U\_WR2}$, $i_{V\_WR2}$, $i_{W\_WR2}$, from which the measured current space vector is formed in each case, are controlled to their target values, even if a zero system current of the second inverter WR2 does not vanish. The respective third phase current $i_{U\_WR2}$, $i_{V\_WR2}$, $i_{W\_WR2}$ is not controlled to its target value with a non-vanishing zero system current of the second inverter WR2. However, permanently changing those phase currents $i_{U\_WR2}$, $i_{V\_WR2}$, $i_{W\_WR2}$ from which the measured current space vector of the second inverter WR2 is formed in each case means that all three phase currents $i_{U\_WR2}$, $i_{V\_WR2}$, $i_{W\_WR2}$ correspond at least approximately (within the hysteresis window) to their target values after a short harmonic phase of the control. As a result, a zero system current in the second inverter WR2 is essentially eliminated (apart from a zero system current with a current strength in the region of the width of the hysteresis window). A zero system current in the first inverter WR1 is indeed not actively controlled, but, on account of the control of the second inverter WR2, does not lead to a circular current between the first inverter WR1 and the second inverter WR2. These properties of the inventive control are detailed below.

By assuming that the controls of both inverters WR1, WR2 are tuned, i.e. that in the middle the α- and β-components of the calculated measured current space vector correspond to the corresponding components of the target current space vector, and that for the phases of both inverters WR1, WR2 the same current target values $i_{U\_target}$, $i_{V\_target}$, $i_{W\_target}$ are used in each case, the following equations [5] to [7] apply to the phase currents $i_{U\_WR1}$, $i_{V\_WR1}$, $i_{W\_WR1}$ of the first inverter WR1.

$$i_{U_{WR_1}} = i_{\alpha_{target}} + i_{0_{WR_1}} = i_{U_{target}} + i_{0_{WR_1}}, \quad [5]$$

$$i_{V_{WR_1}} = \frac{\sqrt{3}\, i_{\beta_{target}} - i_{\alpha_{target}}}{2} + i_{0_{WR_1}} = i_{V_{target}} + i_{0_{WR_1}}, \quad [6]$$

$$i_{W_{WR_1}} = \frac{-\sqrt{3}\, i_{\beta_{target}} - i_{\alpha_{target}}}{2} + i_{0_{WR_1}} = i_{W_{target}} + i_{0_{WR_1}}. \quad [7]$$

The measured values of the phase currents $i_{U\_WR1}$, $i_{V\_WR1}$, $i_{W\_WR1}$ of the first inverter WR1 therefore deviate from the respective current target values $i_{U\_target}$, $i_{V\_target}$, $i_{W\_target}$ about the zero system current $i_{0_{WR1}}$ of the first inverter WR1.

In the exemplary embodiment shown in FIG. 2, no zero system current can flow over the mains supply. The following connection therefore results.

$$i_{U_{Network}} + i_{V_{Network}} + i_{W_{Network}} = 0 = \{i_{U_{WR1}} + i_{U_{WR3}}\} + \{i_{V_{WR1}} + i_{V_{WR2}}\} + \{i_{W_{WR1}} + i_{W_{WR2}}\} \quad [8]$$

For the second inverter WR2, equations for the phase currents $i_{U\_WR2}$, $i_{V\_NR2}$, $i_{W\_WR2}$ can likewise be set up for the first inverter WR1. For the following explanations, it is assumed by way of example that the measured current space vector of the second inverter WR2 is formed according to equation [2]. The phase currents $i_{U\_WR2}$, $i_{V\_WR2}$ then result in accordance with the following equations [9] and [10]:

$$i_{U_{WR_2}} = i^*_{\alpha_{WR_2}} + i^*_{0_{WR_2}} = i_{\alpha_{target}} + 0 = i_{U_{target}}, \quad [9]$$

$$i_{V_{WR_2}} = \frac{\sqrt{3}\, i^*_{\beta_{WR_2}} - i^*_{\alpha_{WR_2}}}{2} + i^*_{0_{WR_2}} = \frac{\sqrt{3}\, i_{\beta_{target}} - i_{\alpha_{target}}}{2} + 0 = i_{V_{target}}. \quad [10]$$

This shows that the two phase currents $i_{U\_WR2}$, $i_{V\_WR2}$ used in this case to form the measured current space vector of the second inverter WR2 are controlled to their current target values. The third phase current $i_{W\_WR2}$ is not controlled to its current target value. The set-up of equation [2] was based on the assumption that the zero system current of the second inverter WR2 vanishes ($0 = i_{U\_WR2} + i_{V\_WR2} + i_{W\_WR2}$). This assumption is however generally not relevant and can therefore not be used to calculate and control the phase current $i_{W\_WR2}$.

The equations [5] to [10] show:

$$0 = \{(i_{U_{target}} + i_{0_{WR1}}) + i_{U_{target}}\} + \{(i_{V_{target}} + i_{0_{WR1}}) + i_{V_{target}}\} + \{(i_{W_{target}} + i_{0_{WR1}}) + i_{W_{WR2}}\}. \quad [11]$$

If the node rule (e.g. $i_{U\_WR1} + i_{U\_WR2} = i_{U\_Network}$) is additionally applied to the individual phases, the following equations [12] to [15] result:

$$i_{U_{Network}} = 2 \times i_{U_{target}} + i_{0_{WR1}}, \quad [12]$$

$$i_{V_{Network}} = 2 \times i_{V_{target}} + i_{0_{WR1}}, \quad [13]$$

$$i_{W_{Network}} = i_{W_{target}} + i_{0_{WR1}} + i_{W_{WR1}} + i_{W_{WR3}} = 2 * i_{W_{target}} + (i_{0_{WR1}} + i_{W_{WR2}} - i_{W_{target}}) = 2 * i_{W_{target}} - 2 * (i_{0_{WR1}}) \quad [14]$$

$$-(i_{W_{WR2}} - i_{W_{target}}) = -i_{0_{WR2}} = 3 * i_{0_{WR1}}, \quad [15]$$

wherein $i_{O\_WR2} = i_{U\_WR2} + i_{V\_WR2} + i_{W\_WR2}$ has been used.

Two basic statements can be derived from the equations [12] to [15]:

On account of the zero system currents of the inverters WR1, WR2, the resulting phase network currents $i_{U\_Network}$, $i_{V\_Network}$, $i_{W\_Network}$ deviate from their target values.

The first inverter WR1 deviates in all three phase currents $i_{U\_WR1}$, $i_{VWR1}$, $i_{W\_WR1}$ by the same amount from the current target values. The second inverter WR2 deviates at each time instant only in one phase from the current target value, but with triple the difference.

The above statements have been made in the instance that a phase is not used to form the measured current space vector of the second inverter WR2. Similarly, the observations and equations can also be applied to another phase.

Both inverters WR1, WR2 have the same switching state in the phase which is not currently switched according to the Flat Top modulation. An approximately identical voltage therefore also drops on the two inductances L of the corresponding phase (component scatterings, temperature differences etc. can lead to slight differences). This results in the phase current difference between the two inverters WR1, WR2 also only changing minimally in this phase. According to equations [12] to [15], the circular current therefore also remains (approximately) constant.

As has been mentioned above, the phase not used to form the measured current space vector of the second inverter WR2 changes permanently. A circular current existing in the second inverter WR2 before a change is automatically in an "active" phase after the change, i.e. in a phase which is used to form the measured current space vector of the second inverter WR2, and after the change is therefore controlled directly by the control. The phase current $i_{U\_WR2}$, $i_{V\_WR2}$, $i_{W\_WR2}$ which is not used after the change to form the measured current space vector of the second inverter WR2 approximately assumes its current target value prior to the change (with a steady-state control). Since only the average value of the phase current $i_{U\_WR2}$, $i_{V\_WR2}$, $i_{W\_WR2}$ corresponds to the current target value, however, and the time instant of the change is not known, a circular current with a current strength in the range of the hysteresis width of the control can arise. With a steady-state control between two changes in that phase which is not used to form the measured current space vector of the second inverter WR2, an existing circular current therefore remains approximately constant and is controlled by the change in this phase.

The control described by way of example above for two inverters WR1, WR2 is applied analogously for more than two three-phase inverters WR1, WR2 which are connected in parallel, wherein one of the inverters WR1, WR2 is controlled like the first inverter WR1 of the above-described control and each further inverter WR1, WR2 is controlled like the second inverter WR2 of the above-described control.

The above described current control can also be used analogously instead for two level inverters, the switches $S_{U\_WR1}$, $S_{V\_WR1}$, $S_{W\_WR1}$, $S_{U\_WR2}$, $S_{V\_WR2}$, $S_{W\_WR2}$ of which only have two switching states, also for multi-level inverters, the switches $S_{U\_WR1}$, $S_{V\_WR1}$, $S_{W\_WR1}$, $S_{U\_WR2}$, $S_{V\_WR2}$, $S_{W\_WR2}$ of which have more than two switching states.

Although the invention has been illustrated and described in detail based on preferred exemplary embodiments, the invention is not restricted by the examples given and other variations can be derived therefrom by a person skilled in the art without departing from the protective scope of the invention.

Although the invention has been illustrated and described in detail based on preferred exemplary embodiments, the invention is not restricted by the examples given and other variations can be derived therefrom by a person skilled in the art without departing from the protective scope of the invention.

What is claimed is:

1. A method for controlling phase currents of a plurality of three-phase inverters connected in parallel, said method comprising:
   controlling the phase currents of each of the plurality of inverters with a direct hysteresis current control;
   maintaining an actual current space vector for actual values of the phase currents of each inverter within a hysteresis window about a target current space vector;
   forming the actual current space vector of a first inverter of the plurality of the three-phase inverters from all phase currents of the first inverter;
   forming the actual current space vector of each additional inverter of the plurality of inverters from exactly two phase currents of the each additional inverter provided that all three three phase currents of the each additional inverter add up to zero; and
   varying a selection of the exactly two phase currents of the each additional inverter.

2. The method of claim 1, further comprising controlling the phase currents of each of the plurality of inverters independently of the actual values of the phase currents of another of the plurality of inverters.

3. The method of claim 1, wherein for the each additional inverter, a third phase current that is not used to form the actual current space vector is not actively controlled.

4. The method of claim 1, further comprising varying for the each additional inverter the selection of the exactly two phase currents, from which the actual current space vector is formed, as a function of a phase relationship of output voltages of the each additional inverter.

5. The method of claim 1, further comprising selecting for the each additional inverter a phase having an output voltage of the each additional inverter with a greatest magnitude as the phase that is not used to form the actual current space vector.

6. The method of claim 1, further comprising using at each time instant a same target current space vector for all inverters.

7. The method of claim 1, further comprising forming each actual current space vector and each target current space vector in a fixed stator coordinate system.

8. The method of claim 7, wherein the actual current space vector of the first inverter is formed according to $$\begin{pmatrix} i_{\alpha_{WR_1}} \\ i_{\beta_{WR_1}} \\ i_{0_{WR_1}} \end{pmatrix} = \frac{1}{3} \begin{pmatrix} 2 & -1 & -1 \\ 0 & \sqrt{3} & -\sqrt{3} \\ 1 & 1 & 1 \end{pmatrix} * \begin{pmatrix} i_{U_{WR_1}} \\ i_{V_{WR_1}} \\ i_{W_{WR_1}} \end{pmatrix},$$

wherein $i_{\alpha\_WR1}$, $i_{\beta\_WR1}$, $i_{0\_WR1}$ are the coordinates of the actual current space vector of the first inverter, and $i_{U\_WR1}$, $i_{V\_WR1}$, $i_{W\_WR1}$ are the three phase currents of the first inverter.

9. The method of claim 8, wherein the actual current space vector of the each additional inverter is formed according to $$\begin{pmatrix} i_{\alpha_{WR_2}} \\ i_{\beta_{WR_2}} \\ i_{0_{WR_2}} \end{pmatrix}^* = \frac{1}{3}\begin{pmatrix} 3 & 0 & 0 \\ \sqrt{3} & 2\sqrt{3} & 0 \\ 0 & 0 & 0 \end{pmatrix} * \begin{pmatrix} i_{U_{WR_2}} \\ i_{V_{WR_2}} \\ i_{W_{WR_2}} \end{pmatrix}$$

or according to $$\begin{pmatrix} i_{\alpha_{WR_2}} \\ i_{\beta_{WR_2}} \\ i_{0_{WR_2}} \end{pmatrix}^{**} = \frac{1}{3}\begin{pmatrix} 0 & -3 & -3 \\ 0 & \sqrt{3} & -\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}$$

or according to $$\begin{pmatrix} i_{\alpha_{WR_2}} \\ i_{\beta_{WR_2}} \\ i_{0_{WR_2}} \end{pmatrix}^{***} = \frac{1}{3}\begin{pmatrix} 3 & 0 & 0 \\ -\sqrt{3} & 0 & -2\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix},$$

wherein $i_{\alpha\_WR2}$, $i_{\beta\_WR2}$, $i_{0\_WR2}$ are coordinates of the actual current space vector of the each additional inverter, and $i_{U\_WR2}$, $i_{V\_WR2}$, $i_{W\_WR2}$ are the three phase currents of the each additional inverter.

10. The method of claim 1, further comprising using SDHC current control (Switched Diamond Hysteresis Control) as the hysteresis current control.

11. The method of claim 1, wherein the plurality of inverters are directly interconnected on a direct voltage side and are interconnected on an alternating voltage side by way of filters.

12. A control device for controlling phase currents of a plurality of three-phase inverters connected in parallel, comprising:
- a dedicated current measuring device connected to each inverter for acquiring actual values of the phase currents of phases of each inverter, and
- a dedicated hysteresis current control device connected to the each inverter, wherein the dedicated hysteresis current control device of the each inverter is configured to
  - form from the acquired actual values of the phase currents an actual current space vector for the each inverter,
  - produce switching signals for the phases of the each inverter so as to keep the actual current space vector for the each inverter within a hysteresis window about a target current space vector, wherein the actual current space vector of a first inverter of the plurality of the three-phase inverters is formed from all phase currents of the first inverter; and the actual current space vector of each additional inverter of the plurality of the three-phase inverters is formed from exactly two phase currents of the each additional inverter provided all three phase currents of the each additional inverter add up to zero, and
  - vary a selection of the exactly two phase currents of the each additional inverter.

\* \* \* \* \*